United States Patent [19]

Strassel

[11] 4,317,860
[45] Mar. 2, 1982

[54] POLYVINYLIDENE FLUORIDE-THERMOPLASTIC RESIN LAMINATES AND METHOD

[75] Inventor: Albert Strassel, Oullins, France

[73] Assignee: Produits Chimiques Ugine Kuhlmann, Courbevoie, France

[21] Appl. No.: 71,675

[22] Filed: Aug. 31, 1979

[30] Foreign Application Priority Data

Sep. 25, 1978 [FR] France .............................. 78 27361
May 22, 1979 [FR] France .............................. 79 12952

[51] Int. Cl.³ ............................................. B32B 27/00
[52] U.S. Cl. ................................. 428/421; 156/244.11; 156/311; 428/420; 428/422; 428/520; 428/522
[58] Field of Search ....................... 156/244.11, 244.24, 156/311; 428/420–422, 520, 522

[56] References Cited

U.S. PATENT DOCUMENTS

| | | |
|---|---|---|
| Re. 27,610 | 4/1973 | Rausing et al. ............ 156/244.11 X |
| 2,774,702 | 12/1956 | Smith ................................ 428/422 |
| 3,111,426 | 11/1963 | Capron et al. .................. 428/421 X |
| 3,524,906 | 8/1970 | Schmitt et al. ................. 428/421 X |
| 3,622,439 | 11/1971 | Manne et al. ................... 428/420 X |
| 3,679,510 | 7/1972 | Conley et al. .................. 428/420 X |
| 3,893,879 | 7/1975 | Ito et al. ..................... 156/244.11 X |
| 4,226,904 | 10/1980 | Ollivier et al. ................. 428/515 X |

Primary Examiner—Thomas J. Herbert, Jr.
Attorney, Agent, or Firm—Sigalos & Levine

[57] ABSTRACT

The present invention relates to laminates comprising a polyvinylidene fluoride resin layer, a thermoplastic resin layer, and an intermediate polyalkyl methacrylate layer and to the method of making such laminates, preferably by coextrusion.

7 Claims, 2 Drawing Figures

POLYVINYLIDENE FLUORIDE-THERMOPLASTIC RESIN LAMINATES AND METHOD

BACKGROUND OF THE INVENTION

The technique of coextrusion of at least two thermoplastic materials is well known and it is described, in particular, in POLYMER PLASTICS TECHNOLOGY AND ENGINEERING, Volume 3, pages 40–68: "Coextruded Films—Process and Properties" by John E. Guillotte.

Generally speaking, three methods of proceeding with the coextrusion of thermoplastic materials are known using conventional extruders whose number is equal to the number of polymers to be extruded. The first method consists of extruding the polymers separately and combining them as they exit the extrusion dies. The second method consists of feeding a single die by means of at least two extruders, with the die including as many passages as there are extruders and, consequently, polymers to be extruded. The streams of polymers meet at the level of the exit orifice of the die, thus perceptibly just prior to exiting from the latter. The third method consists of feeding a stream distributor by means of the desired number of extruders. In this distributor, the polymers combine into a single stream which is supplied to the die. In these processes, the respective flow rates of the extruders usually make it possible to control the relative thicknesses of the extruded polymers.

While numerous polymers can be thus coextruded, it has not been possible to satisfactorily combine a polyvinylidene fluoride (hereinafter "$PVF_2$") with other polymers by these techniques. The reason, it is believed, is probably due to the lack of compatibility of the $PVF_2$ with the other polymers and to the well-known lack of adhesion between fluorine-containing resins and the majority of thermoplastic polymers. This difficulty of associating (combining) $PVF_2$ with the other thermoplastics is encountered even when the conventional laminating or veneering technique is applied to it. This consists in attempting to cause two films having been manufactured beforehand; one made of $PVF_2$ and the other one made another thermoplastic resin, to adhere to each other under pressure in the heated state. Such attempts have even been carried out unsuccessfully by using a prefabricated $PVF_2$ film and films of polyvinyl chloride, polystyrene, polymethyl methacrylate, or acrylonitrile-butadiene-styrene copolymer coming out of the extruder; that is to say in a practically molten state. Even under these conditions, after cooling, the two polymer layers can easily be separated.

In the present state of this art, when it is desired to combine a $PVF_2$ resin with an "incompatible" thermoplastic resin (one that will not adhere to the $PVF_2$) it is necessary to resort to an adhesive. This method has the drawback of requiring three operating phases:

1. preparation of the $PVF_2$ film;
2. preparation of the thermoplastic film; and
3. application of the adhesive and pressing one film to the other.

These operations are not commercially practical in that they are slow and generally necessitate the use of adhesives having a solvent base, with these solvents being difficult to eliminate, and not permitting the immediate use of the composite material because of the time required for drying of the adhesive. Moreover, the laminate obtained lacks cohesion, with the interfaces remaining sensitive to all phenomena apt to cause ungluing. As a result, it can be said that by adhesion one does not obtain a unitary laminate, but a simple juxtaposition of thermoplastic elements whose final structure is heterogeneous.

SUMMARY OF THE INVENTION

The present invention remedies these drawbacks and makes it possible to obtain new and true unitary laminates having a homogeneous interface structure since the constituents are tightly bonded together.

Briefly, the present invention comprises a laminate comprising a layer of $PVF_2$, a thermoplastic resin layer, and an intermediate layer of a polyalkyl methacrylate; preferably a laminate in which a $PVF_2$ layer is at least one of the exterior surfaces of the laminate, and to the method of making such laminates; preferably by coextrusion, as more specifically described below.

DETAILED DESCRIPTION

Figure 1:
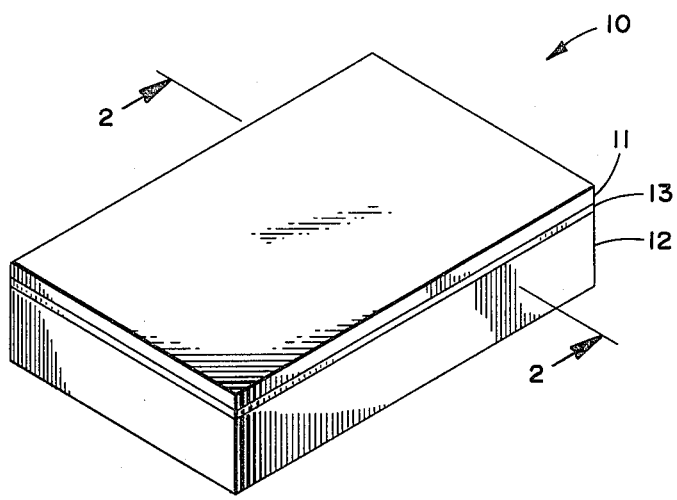
FIG. 1 is a perspective view of a laminate of the present invention.

The instant laminates are characterized by the fact that the two polymer layers are joined together over their entire surface by means of a polyalkyl methacrylate which itself is intimately united to the surfaces of the two polymer layers. The interfaces of $PVF_2$/polyalkyl methacrylate and of thermoplastic polymer/polyalkyl methacrylate are found to be in such a form of blending or union as one can imagine it on the basis, for instance, of a mixture of the components in the molten state. They are not three discrete layers. This form of intimate bond or union between the components is used herein to describe the laminates as being "unitary and of homogeneous structure" in contrast to a laminate which has a heterogeneous structure which could, for example, be obtained by gluing, and in which the interfaces are clearly marked and vulnerable to separation at such interfaces, since in this latter case they do not exhibit a transition zone. The product according to the invention can also be defined as a laminate having three components and formed by a blending or union of a polyalkyl methacrylate/$PVF_2$ layer and of a polyalkyl methacrylate/thermoplastic polymer layer with said product possessing at least one external surface of $PVF_2$ and one surface of thermoplastic. The external $PVF_2$ face or faces of the laminate are usually devoid of polyaklyl methacrylate serving as the bond. This is easily understandable, since it is desired to preserve all of the $PVF_2$ intrinsic properties at the surface of the laminate.

Above all for reasons of economy, the laminate generally possesses only a single external $PVF_2$ layer, with the other external face being represented by the thermoplastic polymer. However, the thermoplastic polymer can serve as the fastening base for another material. It is then possible for the laminate according to the invention to possess its two external faces made of $PVF_2$ according to the following succession of blendings or unions of the three constituents: $PVF_2$/polyalkyl methacrylate/thermoplastic polymer/polyalkyl methacrylate/$PVF_2$.

The instant laminates, which can exist in all of the usual forms for thermoplastics such as, for instance, tubes (pipes), sheaths, shaped pieces, films, sheets, and plates, with the latter themselves being transformable according to known techniques such as, for instance, thermoforming, are of great interest since they possess at least one external face resistant to weathering and generally speaking all of the other desirable properties characteristic of $PVF_2$ and another face possessing the mechanical properties and generally speaking all of the properties characteristic of other thermoplastic polymers; and this in the form of a structure being structurally unitary and homogeneous.

As to components, although all of the $PVF_2$'s yield satisfactory results, the best results are obtained with a $PVF_2$ which at 200° C. has an apparent viscosity in poises between the minimum and maximum values set forth in the table below for at least two of the viscosity gradients in $sec^{-1}$.

| Viscosity gradient | Apparent viscosity values in poise | |
| $sec^{-1}$ | minimum | maximum |
| --- | --- | --- |
| 3.54 | $30 \times 10^3$ | $200 \times 10^3$ |
| 11.81 | $18 \times 10^3$ | $93 \times 10^3$ |
| 35.4 | $11 \times 10^3$ | $47 \times 10^3$ |
| 118 | $6.5 \times 10^3$ | $21 \times 10^3$ |
| 354 | $3.9 \times 10^3$ | $10 \times 10^3$ |
| 1181 | $2.3 \times 10^3$ | $4.5 \times 10^3$ |

The apparent viscosities in question are measured in the known and conventional manner by means of a capillary rheometer, taking RABINOWITCH'S correction applied to non-Newtonian liquids into account.

Although generally speaking, the thickness of the $PVF_2$ layer is unimportant, for economic reasons it is preferable to produce a laminate whose $PVF_2$ layer thickness is between 10 microns and a few tenths of a millimeter. The term "$PVF_2$" as used herein is meant to include not only the homopolymers thereof, but also copolymers containing at least 70% of $PVF_2$ by weight or mixtures of $PVF_2$ with other polymers.

The polyalkyl methacrylate preferably is a polymethyl methacrylate, PMMA whose viscosity in the molten state can be chosen from the viscosity range of commercial PMMA's. Those skilled in the polymer art are familiar with the possible means of bringing the viscosity to the desired value by blending, for instance, with small quantities of fillers and this can be done; provided, however, that at least 75% of polyalkyl methacrylate by weight is used.

It has been established, on the other hand, that the quality of the polyalkyl methacrylate used, and possibly that of the $PVF_2$, must be selected as a function of the viscosity of the thermoplastic polymer in the molten state. Excellent results can be obtained with polymethyl methacrylate viscosities between the limits shown for a velocity gradient given below and measured at 200° C. These values are, however, not limiting, because of the possibility of modifying the viscosities as a function of the extrusion temperature, which is well-known to those skilled in this art.

| Velocity gradient | Apparent viscosity values in poise | |
| $sec^{-1}$ | minimum | maximum |
| --- | --- | --- |
| 3.54 | $100 \times 10^3$ | $500 \times 10^3$ |
| 11.81 | $50 \times 10^3$ | $280 \times 10^3$ |
| 35.4 | $25 \times 10^3$ | $150 \times 10^3$ |
| 118 | $13 \times 10^3$ | $80 \times 10^3$ |
| 354 | $7 \times 10^3$ | $50 \times 10^3$ |
| 1181 | $3.5 \times 10^3$ | $30 \times 10^3$ |

It is likewise possible to associate at least one other thermoplastic polymer with the polyalkyl methacrylate by mixing (blending); provided, however, that this mixture contains at least 30% of polyalkyl methacrylate by weight. The polymer which is mixed with the polyalkyl methacrylate can be chosen from among the following products or products of the following families: fluorinated polymers such as fluorinated ethylene propylene; vinyl and vinylidene polymers containing chlorine; styrene polymers; polycarbonate; polyurethanes; polyester-ethers; copolymers of styrene/acrylonitrile/-grafter acrylic elastomer; copolymers of acrylonitrile/-butadiene/styrene; polyacrylic esters such as polymethyl, polyethyl or polybutyl acrylate or the copolymers of these acrylic esters with, for instance, vinyl and vinylidene derivatives; or the copolymers of polyalkyl methacrylate with, for instance, vinyl chloride, vinyl acetate, methyl acrylate, styrene, isobutylene, acrylic acid, acrylonitrile, or methacrylonitrile.

Depending on the particular laminate to be formed, the thickness of the polyalkyl methacrylate is set between a few microns and 200 microns of thickness. Generally, it is not judicious to operate with greater thicknesses because of the importance which the polyalkyl methacrylate would then assume in the mechanical properties of the combination.

The thermoplastic polymer used as the other component of the laminate can be any thermoplastic resin, other than $PVF_2$, which is incompatible with $PVF_2$. As used herein, the phrase "incompatible with $PVF_2$" means those thermoplastic polymers that are not compatible with $PVF_2$ and, particularly, lack adhesion thereto. The thermoplastic polymers can, among others, be vinyl or vinylidene polymers containing chlorine, such as polyvinyl chloride or polyvinylidene chloride; styrene polymers such as polystyrene or impact polystyrene; a polycarbonate; a polyurethane; copolymers of styrene/acrylonitrile/grafted acrylic elastomer, or copolymers of acrylonitrile/butadiene/styrene. The thickness of the layer of this thermoplastic polymer can vary widely; commonly from a few tens of microns to several millimeters. It goes without saying that this thermoplastic polymer can contain the various known and commonly used fillers, plasticizers, stabilizers, coloring agents or adjuvants (subsidiary ingredients), and the like in their usual proportions and for their usual effects.

The laminates can be made in a manner of great interest, by coextrusion, and that in a manner which is all the more surprising, since the notorious difficulty of causing $PVF_2$ to adhere to a thermoplastic polymer is well-known. It has been discovered that if a polyalkyl methacrylate is coextruded at the same time as the $PVF_2$ and the incompatible thermoplastic resin in such a way that the polymethacrylate is located between the two polymers, then one can obtain in one step, a laminate which can be used immediately and all of the different layers of which are intimately bonded to one another. The invention thus likewise concerns the manufacturing method for a laminate made of $PVF_2$ and a thermoplastic polymer incompatible with $PVF_2$, characterized by the fact that the $PVF_2$, a polyalkyl methacrylate, and a thermoplastic polymer being incompatible with $PVF_2$ are coextruded, with the polyalkyl methacrylate serving as intermediate bonding material.

The necessary equipment for the production of the laminate consists of standard extruders, dies, and preferably a stream distributor; all of which are conventional and commonly employed in the coextrusion technique of thermoplastics. The thickness of each layer is controlled by the flow rate of each of the extruders.

For the requirements of the invention, it is preferred that the temperature of the die be kept between 180° and 280° C.; with this temperature depending on the coextruded materials. The temperatures of the extruders are those customarily prescribed in the case of the simple extrusion of each of the polymers.

In order that the final cohesion between the three polymers be assured, it is recommended that the coextrusion of these three polymers be carried out in such a manner that the materials coming out of the extruders are combined, at the latest, at the outlet orifice of the die. In certain cases, the cohesion obtained may leave something to be desired. That is the reason why it is preferable that the molten streams of the $PVF_2$, the thermoplastic resin, and the polyalkyl methacrylate on coming out of the extruder travel together and in contact with one another over a certain length before reaching the outlet orifice of the die. This additional contact time insures cohesion. In the latter case, instead of a die having several ducts, a stream distributor is placed between the outlet of the extruders and a die having a single duct.

According to the usual coextrusion techniques and by means of at least three extruders, as a variation, the following composite material having three components can be obtained: $PVF_2$/polyalkyl methacrylate/thermoplastic polymer being incompatible with $PVF_2$/polyalkyl methacrylate/$PVF_2$.

The present invention will be further described in connection with the examples that follow and in which the viscosity measurements were carried out by means of a capillary rheometer, INSTRON Model 3211, having a capillary of about 50.8 mm. (2 in.) in length for a nozzle diameter of about 1.27 mm. (0.05 in.).

EXAMPLE 1

An apparatus system utilizing three SMTP extruders (SMTP-KAUFMAN) is used, with the first one, which is equipped with a degassing system, having a diameter of 120 mm. and a screw length equal to 33 times its diameter. It is utilized for extruding the acrylonitrile/butadiene/styrene copolymer (ABS), with the second one having a diameter of 50 mm. (Super—2×50) being used for the polymethyl methacrylate (PMMA), and the third one having a diameter of 40 mm. for the $PVF_2$.

These three extruders supply a stream distributor cylinder, itself fastened to an ordinary flat die intended to manufacture a sheet of about 4 mm. thickness, followed by a standard calender and by a standard winding train for the extrusion of sheets.

The ABS is UGIKRAL SF 10 436 made by the Societe des Produits Chimiques Ugine Kuhlmann, the PMMA is ALTULITE 2 710 by the ALTULOR Company, and the $PVF_2$ is FORAFLON 1 000 HD made by the Societe des Produits Chimiques Ugine Kuhlmann.

The viscosity of the ABS measured at 220° C. is $75 \times 10^3$ poise at a velocity gradient of 5.6 sec$^{-1}$ and $10 \times 10^3$ poise at a velocity gradient of 2 sec$^{-1}$. The viscosity of the PMMA measured at 200° C. is $110 \times 10^3$ poise at a velocity gradient of 5.6 sec$^{-1}$ and $14 \times 10^3$ poise at a velocity gradient of 2 sec$^{-1}$.

Finally, the viscosity of the $PVF_2$ measured at 200° C. is $141 \times 10^3$ and $8.8 \times 10^3$ poise at velocity gradients of 3.5 and 354 sec$^{-1}$, respectively.

The heating temperatures of the extruders range from 190° to 210° C. for the ABS, from 180° to 200° C. for the PMMA, and from 180° to 220° C. for the $PVF_2$.

The stream distributor, as well as the die are at 210° C. The film is received between the cylinders of a calender heated to 80° C.

Figure 2:
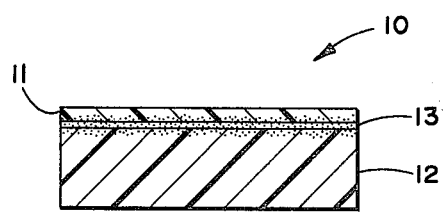
FIG. 2 is a sectional view taken along line 2—2 of FIG. 1.

The total flow rate or output amounts to about 300 kg/hour. The flow rates of the three extruders is regulated in such a way as to obtain a laminate including the ABS in 4 mm. thickness, the PMMA in 30 microns of thickness and the $PVF_2$ in 100 microns of thickness. These three layers are fused perfectly to one another as soon as they come out of the die. After cooling, a laminate of homogeneous structure is obtained, one face of which is made of $PVF_2$, while the other face consists of ABS. Such a sheet is depicted in FIGS. 1 and 2 wherein it is shown that the sheet 10 consists of a polyvinylidene fluoride layer 11, an ABS layer 12, and an intermediate PMMA layer 13.

EXAMPLE 2

The method and polymers of Example 1 are used except that a stream distributor is used making it possible to obtain a laminate composed of five layers on extrusion from the die. The polymers and the extruders of Example 1 are used and heated to the same temperatures to provide a laminate sheet which successively presents a layer of 75 microns of $PVF_2$, a PMMA layer of 50 microns, a layer of ABS of 3 mm. thickness, a layer of 50 microns of PMMA and finally a layer of 75 microns of $PVF_2$. The laminate which is obtained exhibits five layers which are fused perfectly to one another. After cooling, a laminate of homogeneous structure is obtained, which possesses two external faces of $PVF_2$, with the core consisting of ABS.

EXAMPLE 3

Three extruders are used, a double screw extruder (KESTERMANN K 107), for polyvinyl chloride (PVC—EKAVYL SL 66 made by Produits Chimiques Ugine Kuhlmann), an SMTP extruder having a 30 mm. diameter for the polymethyl methacrylate (PMMA—RESARITE KOX 125 by the RESARTE Company), and of a KAUFMAN extruder having a diameter of 40 mm. for the $PVF_2$ (FORAFLON 4 000 HD made by the Societe Produits Chimiques Ugine Kuhlmann).

These three extruders feed a stream distributor which is itself fastened to a tube extrusion head. A standard vacuum former and a standard winding system complete the installation.

The three polymers are coextruded at their normal extrusion temperatures, i.e., 160°–200° C. for the PVC, 180°–200° C. for the PMMA and 180°–200° C. for the $PVF_2$. The extrusion head, as well as the stream distributor are kept at between 195° and 200° C.

A pipe having an external diameter of 50 mm. is obtained which successively consists of a layer of PVC having a thickness of about 3 mm., a layer of PMMA of a thickness of about 50 microns, and an internal layer of $PVF_2$ having a thickness of about 75 microns. The three polymers present themselves in the form of a laminate having a homogeneous and unitary structure.

EXAMPLE 4

The three extruders system of Example 3 with a stream distributor and a tube extrusion head is used. In addition, the equipment includes a standard bottle mold and blowing system, making it possible to carry out a coextrusion/blowing of the three polymers.

A PVC (EKAVYL SK 55B made by the Societe des Produits Chimiques Ugine Kuhlmann) is introduced into the first extruder, while a PMMA (RESARITE KOX 125 by the RESARTE Company) is introduced into the second extruder, and a PVF$_2$ (FORAFLON 1 000 HD made by the Societe des Produits Chimiques Ugine Kuhlmann) is introduced into the third extruder. The posted temperatures respectively are: 160°–180° C., 180°–190° C. and 190°–200° C.; the stream distributor and the outlet nozzle are at 190° C.

A coextruded ball (of molten plastic) is obtained which is blown in standard manner in order to obtain a bottle. The three extruders had been fixed to the stream distributor in such a way that the bottle has an internal layer of PVF$_2$ of about 100 microns in thickness, an intermediate layer of PMMA of about 80 microns in thickness, and finally an external layer of PVC of about 8/10 mm. in thickness.

The three layers of the bottle are perfectly fused to one another as soon as they come out of the extrusion head. After cooling, the bottle in the form of a laminate having a homogeneous and unitary structure.

EXAMPLE 5

Three SMTP extruders (SMTP-KAUFMAN) are used, with the first one, which is equipped with a degassing system, having a diameter of 120 mm. and a screw length equal to 33 times its diameter. It is utilized for extruding the acrylonitrile/butadiene/styrene copolymer (ABS); while the second one having a diameter of 50 mm. (Super—2×50) is used for the mixture in parts by weight of the following polymers: polymethyl methacrylate (PMMA): 40 parts, PVF$_2$: 30 parts, ABS: 30 parts, and the third one having a diameter of 40 mm. is used for the PVF$_2$.

These three extruders supply a stream distributor cylinder, itself fastened to an ordinary flat die intended to manufacture a sheet of about 4 mm. thickness, followed by a standard calender and by a standard winding train for the extrusion of sheets.

The ABS is UGIKRAL SF 10 436 made by the Societe des Produits Chimiques Ugine Kuhlmann, the PMMA is ALTULITE 2 710 by the ALTULOR Company, and the PVF$_2$ is FORAFLON 1 000 HD made by the Societe des Produits Chimiques Ugine Kuhlmann.

The viscosity of the ABS measured at 220° C. is 75×10$^3$ poise at a velocity gradient of 5.6 sec$^{-1}$ and 10×10$^3$ poise at a velocity gradient of 2 sec$^{-1}$. The viscosity of the PMMA measured at 200° C. is 110×10$^3$ poise at a velocity gradient of 5.6 sec$^{-1}$ and 14×10$^3$ poise at a velocity gradient of 2 sec$^{-1}$.

Finally, the viscosity of the PVF$_2$ measured at 200° C. is 141×10$^3$ and 8.8×10$^3$ poise at velocity gradients of 3.5 and 354 sec$^{-1}$, respectively.

The heating temperatures of the extruders range from 190° to 210° C. for the ABS, from 180° to 200° C. for the mixture containing the PMMA, and from 180° to 220° C. for the PVF$_2$.

The stream distributor, as well as the die are at 210° C. The film is received between the cylinders of a calender heated to 80° C.

The total flow rate or output amounts to about 300 kg/hour. The flow rates of the three extruders are regulated in such a way as to finally obtain a laminate including the ABS in 4 mm. thickness, the mixture containing the PMMA in 30 microns of thickness and the PVF$_2$ in 100 microns of thickness. These three layers are fused perfectly to one another as soon as they come out of the die. After cooling, a laminate of hogogeneous structure is obtained, one face of which is made of PVF$_2$, while the other face consists of ABS.

EXAMPLE 6

The conditions of Example 5 are utilized except that the mixture containing PMMA mixture is replaced by the following mixture of: 30 parts by weight of PMMA (RESARITE KOX 125), 40 parts by weight of polyacrylic derivative (ACRYLOID KM 323 B) and 30 parts by weight of ABS (UGIKRAL SF 10 436 made by the Societe des Produits Chimiques Ugine Kuhlmann). A laminate of homogeneous structure is obtained, whose layers are fused perfectly to one another as soon as they come out of the die.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A unitary laminate comprising at least one polyvinylidene fluoride resin layer, a layer of a thermoplastic resin other than a polyvinylidene fluoride, and a layer of a polyalkyl methacrylate intermediate and firmly adhered to said polyvinylidene fluoride and thermoplastic resin layers; said layers being blended at their interfaces only.

2. The laminate of claim 1 wherein the polyvinylidene fluoride used to form said polyvinylidene fluoride layer has, at 200° C., an apparent viscosity, in poises, between the minimum and maximum values for at least two of the viscosity gradients, in sec$^{-1}$, set forth below:

| Viscosity gradient | Apparent viscosity values in poise | |
|---|---|---|
| sec$^{-1}$ | minimum | maximum |
| 3.54 | 30 × 10$^3$ | 200 × 10$^3$ |
| 11.81 | 18 × 10$^3$ | 93 × 10$^3$ |
| 35.4 | 11 × 10$^3$ | 47 × 10$^3$ |
| 118 | 6.5 × 10$^3$ | 21 × 10$^3$ |
| 354 | 3.9 × 10$^3$ | 10 × 10$^3$ |
| 1181 | 2.3 × 10$^3$ | 4.5 × 10$^3$ |

3. The laminate of claim 1 or 2 wherein the polyalkyl methacrylate is a polymethyl methacrylate.

4. The laminate of claim 3 wherein the polymethyl methacrylate has a viscosity, in poises, at 200° C. between the minimum and maximum values for any given viscosity gradient, in sec$^{-1}$, set forth below:

| Velocity gradient | Apparent viscosity values in poise | |
|---|---|---|
| sec$^{-1}$ | minimum | maximum |
| 3.54 | 100 × 10$^3$ | 500 × 10$^3$ |
| 11.81 | 50 × 10$^3$ | 280 × 10$^3$ |

-continued

| Velocity gradient sec$^{-1}$ | Apparent viscosity values in poise | |
| --- | --- | --- |
| | minimum | maximum |
| 35.4 | 25 × 10$^3$ | 150 × 10$^3$ |
| 118 | 13 × 10$^3$ | 80 × 10$^3$ |
| 354 | 7 × 10$^3$ | 50 × 10$^3$ |
| 1181 | 3.5 × 10$^3$ | 30 × 10$^3$ |

5. The laminate of claim 1 or 2 wherein the polyvinylidene fluoride resin is selected from homopolymers of polyvinylidene fluoride, copolymers containing at least 70% by weight of polyvinylidene fluoride, or mixtures of polyvinylidene fluoride with other polymers.

6. The laminate of claim 5 wherein the polyalkyl methacrylate is a polymethyl methacrylate and the thermoplastic resin is selected from vinyl or vinylidene polymers containing chlorine, styrene polymers, polycarbonates, polyurethanes, copolymers of styrene/acrylonitrile/grafted acrylic elastomer, or copolymers of acrylonitrile/butadiene/styrene.

7. A unitary laminate consisting essentially of at least one exterior layer of a polyvinylidene fluoride resin layer, a layer of a thermoplastic resin other than a polyvinylidene fluoride, and a layer of a polyalkyl methacrylate intermediate and firmly adhered to said polyvinylidene fluoride and thermoplastic resin layers, said laminate formed by coextrusion of the three layers.

* * * * *